United States Patent
Zhang et al.

(10) Patent No.: US 11,284,168 B2
(45) Date of Patent: Mar. 22, 2022

(54) PRESENTING INFORMATION ON SIMILAR OBJECTS RELATIVE TO A TARGET OBJECT FROM A PLURALITY OF VIDEO FRAMES

(71) Applicant: Alibaba Group Holding Limited, George Town (KY)

(72) Inventors: Yanhao Zhang, Beijing (CN); Chenwei Xie, Hangzhou (CN); Yuan Shen, Hangzhou (CN); Jie Lin, Hangzhou (CN); Yun Zheng, Beijing (CN); Pan Pan, Beijing (CN); Yinghui Xu, Hangzhou (CN)

(73) Assignee: Alibaba Group Holding Limited

(*) Notice: Subject to any disclaimer, the term of this patent is extended or adjusted under 35 U.S.C. 154(b) by 0 days.

(21) Appl. No.: 17/076,345

(22) Filed: Oct. 21, 2020

(65) Prior Publication Data
US 2021/0127178 A1    Apr. 29, 2021

(30) Foreign Application Priority Data
Oct. 24, 2019  (CN) .......................... 201911015647.0

(51) Int. Cl.
| | |
|---|---|
| *H04N 21/81* | (2011.01) |
| *H04N 21/234* | (2011.01) |
| *H04N 21/8547* | (2011.01) |
| *H04N 21/431* | (2011.01) |
| *H04N 21/43* | (2011.01) |
| *G06K 9/20* | (2006.01) |
| *G06K 9/00* | (2022.01) |

(52) U.S. Cl.
CPC ... *H04N 21/8133* (2013.01); *H04N 21/23418* (2013.01); *H04N 21/4316* (2013.01); *H04N 21/43074* (2020.08); *H04N 21/8547* (2013.01); *G06K 9/00744* (2013.01); *G06K 9/2054* (2013.01)

(58) Field of Classification Search
CPC ......... H04N 21/8133; H04N 21/43074; H04N 21/23418; H04N 21/4316; H04N 21/8547
See application file for complete search history.

(56) References Cited

U.S. PATENT DOCUMENTS

| | | |
|---|---|---|
| 2007/0127774 A1 | 6/2007 | Zhang |
| 2010/0106732 A1 | 4/2010 | Atallah |
| 2015/0117703 A1 | 4/2015 | Peng |
| 2018/0157939 A1* | 6/2018 | Butt ...................... H04N 21/44 |

* cited by examiner

*Primary Examiner* — Nicholas T Corbo
(74) *Attorney, Agent, or Firm* — Van Pelt, Yi & James LLP

(57) ABSTRACT

Presenting information on similar objects relative to a target object is disclosed, including: obtaining a plurality of video frames; determining a target object in the plurality of video frames using a tracking recognition technique; determining time slice information corresponding to the target object; using the time slice information corresponding to the target object to determine one or more similar objects relative to the target object; receiving an indication to present information on the one or more similar objects relative to the target object; and outputting the information on the one or more similar objects relative to the target object.

20 Claims, 13 Drawing Sheets

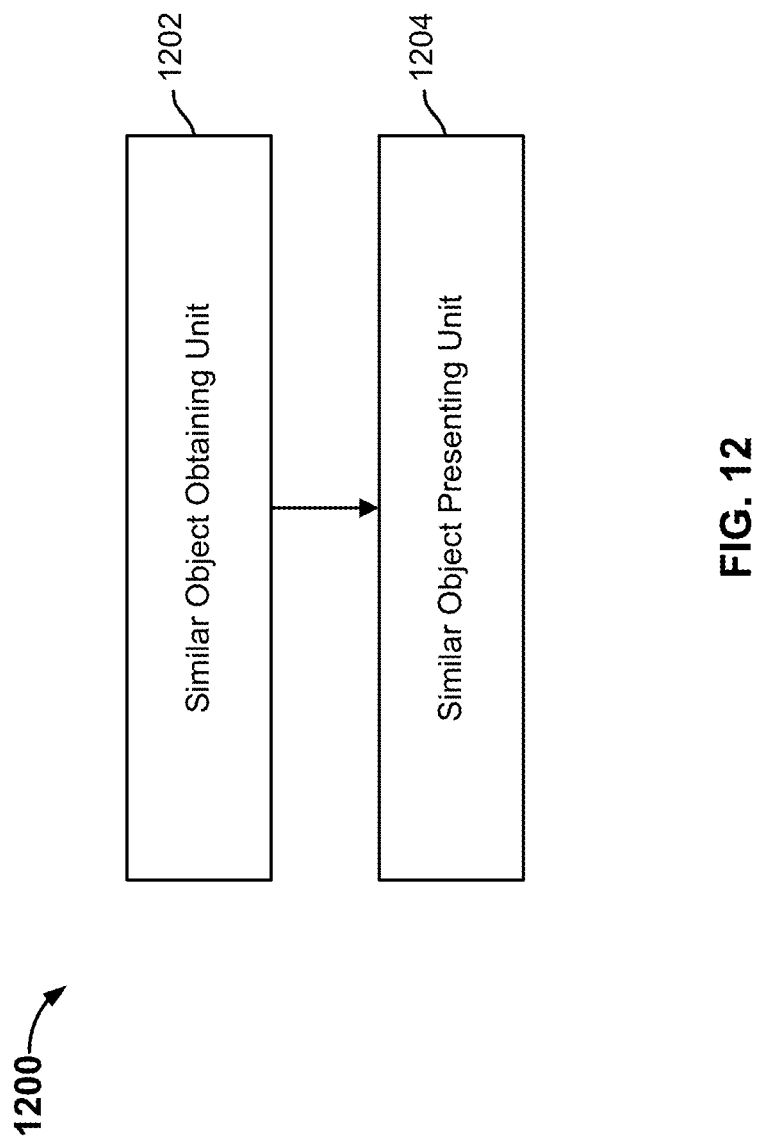

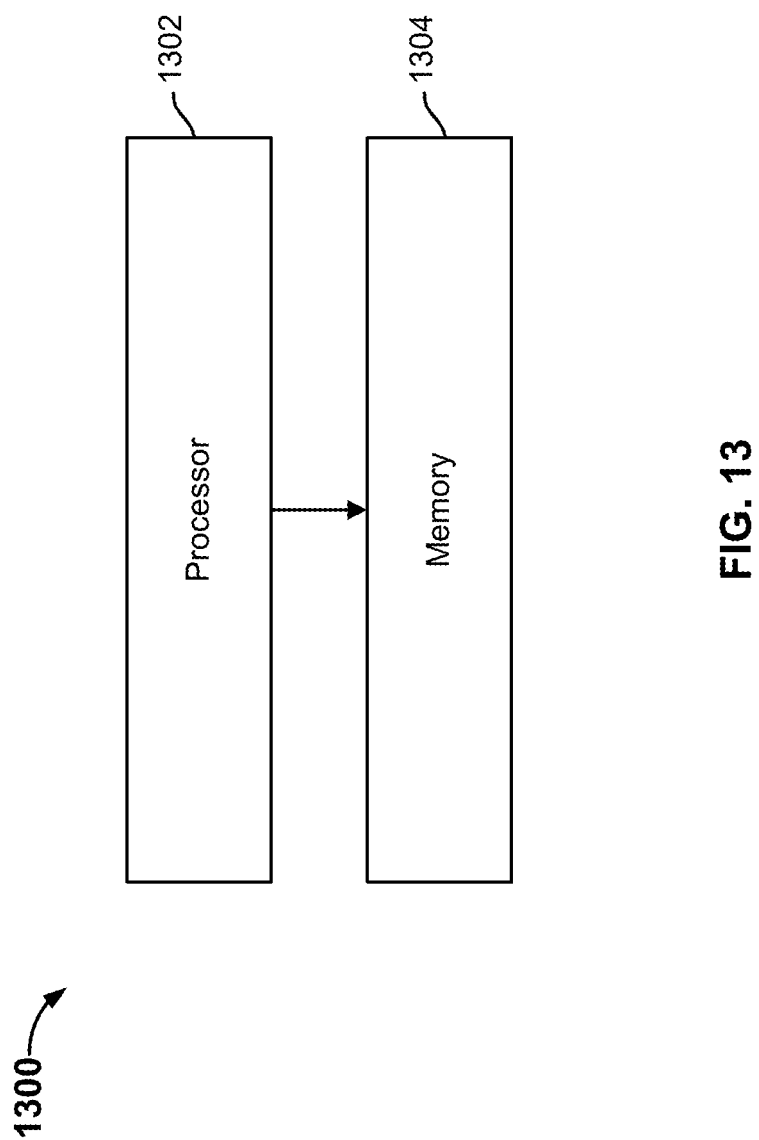

PRESENTING INFORMATION ON SIMILAR OBJECTS RELATIVE TO A TARGET OBJECT FROM A PLURALITY OF VIDEO FRAMES

CROSS REFERENCE TO OTHER APPLICATIONS

This application claims priority to People's Republic of China Patent Application No. 201911015647.0 entitled DATA PROCESSING METHODS, A MERCHANDISE DISPLAY METHOD AND VIDEO PLAYING METHODS filed Oct. 24, 2019 which is incorporated herein by reference for all purposes.

FIELD OF THE INVENTION

The present application relates to a field of information presentation technology. In particular, the present application relates to techniques for presenting information concurrently with the playing of a plurality of video frames.

BACKGROUND OF THE INVENTION

As the Internet continues to develop, advertised recommendations related to video content will appear while users are watching videos.

Video content-related merchandise is recommended to users while they are watching videos. Users are thus able to instantly obtain video content-related merchandise information. For example, while a television show is being played, a kind of sports beverage can be recommended to the viewing audience when a graphic of legs going wobbly appears in a frame. In the case of at least some existing products, video operators manually label and match video content-related merchandise and merchandise links according to pre-configured relationships for the video content that is to be viewed by users.

In conventional techniques, the methods of recommending video content-related merchandise to users while they are watching videos suffer from at least the following defects: when the video content is excessively large, manually labeling and matching video content-related merchandise and merchandise links is extremely time-consuming and labor-intensive. Due to the great number of videos, a purely manual approach will often result in omissions of similar merchandise, with the result that merchandise is never recommended.

BRIEF DESCRIPTION OF THE DRAWINGS

Various embodiments of the invention are disclosed in the following detailed description and the accompanying drawings.

FIG. 12 is a diagram showing an embodiment of a system for presenting similar object information relative to a target object of a plurality of video frames.

FIG. 13 is a diagram showing an embodiment of a system for presenting similar object information relative to a target object of a plurality of video frames.

DETAILED DESCRIPTION

Figure 1:
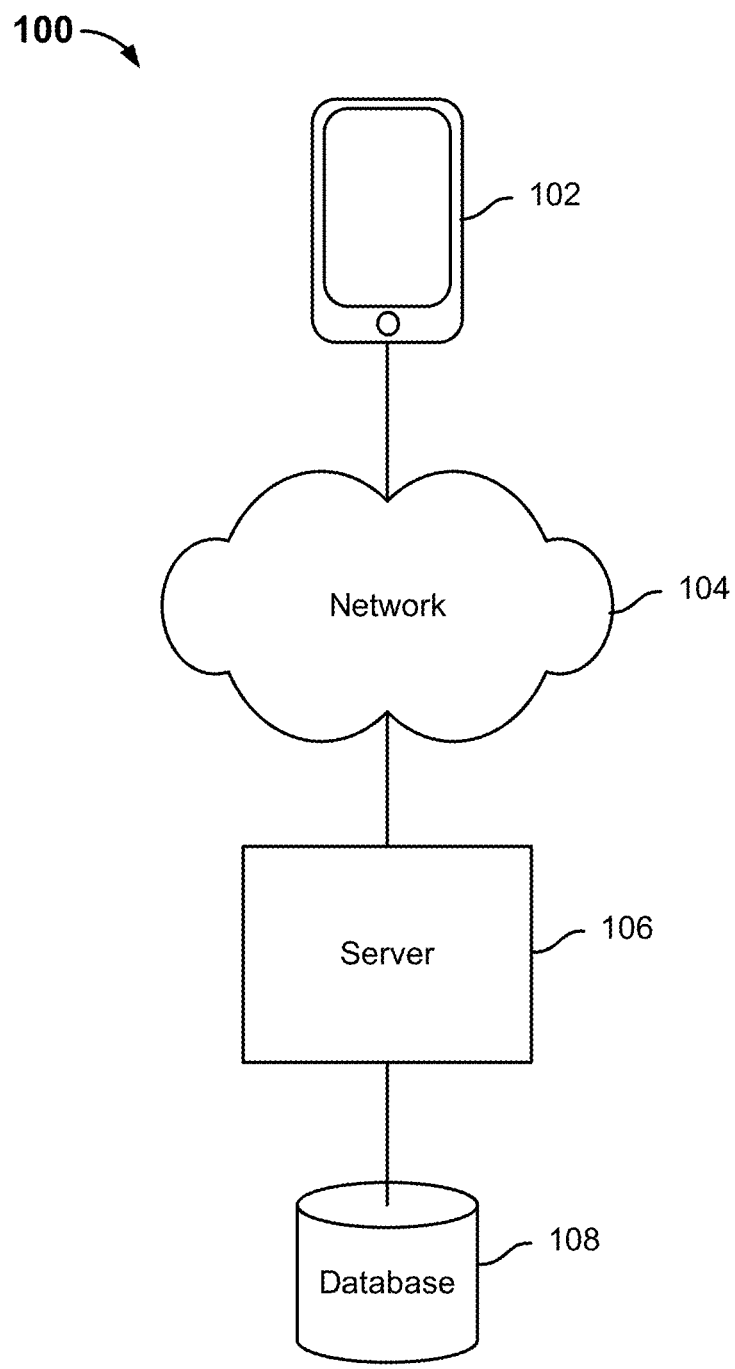
FIG. 1 is a diagram showing an embodiment of a system for presenting information on similar objects relative to a target object of a plurality of video frames.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The description below sets forth many specific details in order to facilitate a full understanding of the present invention. However, the present invention can be realized in many forms other than those described here, and, without departing from the meaning of the present invention, persons skilled in the art can popularize it in similar forms. Therefore, the present invention is not limited by the specific embodiments disclosed below.

Embodiments of presenting information on similar objects relative to a target object in a plurality of video frames are described herein. A plurality of video frames is obtained. A target object in the plurality of video frames is determined using a tracking recognition technique. Time slice information corresponding to the target object is used to determine one or more similar objects relative to the target object. An indication to present information on the one or more similar objects relative to the target object is received. Information on the one or more similar objects relative to the target object is presented.

FIG. 1 is a diagram showing an embodiment of a system for presenting information on similar objects relative to a target object of a plurality of video frames. As shown in system 100 of FIG. 1, device 102 is configured to communicate with server 106 over network 104. Network 104 may include high-speed data and/or telecommunications networks. Examples of device 102 include a laptop computer, a desktop computer, a smart phone, a tablet device, and/or any networked device.

Server 106 is configured to determine and store similar object information relative to target objects that are recognized from the video frames of video data. For example, the video data may be a video frame or a video stream. In various embodiments, server 106 is configured to receive video frames. Server 106 is configured to detect one or more target objects from the video frames. For example, the images or other identifying information of one or more target objects is input to server 106 and server 106 uses the input images or identifying information to track the target object(s) as they appear among the video frames. Alternatively, images or other identifying information of one or more target objects is not supplied to server 106 and server 106 is configured to programmatically detect a target object that appears among the video frames of the video data. For each target object, server 106 is configured to determine corresponding time slice information. In various embodiments, "time slice information" corresponding to a target object is a time range within the video data that comprises the start time to the end time of a segment of the video data in which the video frames of that segment include the appearance of the target object. For example, if the target object is a piece of clothing, and if video frames containing this piece of clothing are frame 15 through frame 100 of video data, the time slice information corresponding to this target object is the time range/segment in the video data that starts from the timestamp of frame 15 and ends with the timestamp of frame 100. The timestamp refers to the play time of the video frame.

After server 106 determines the time slice information corresponding to a target object of video data, server 106 is configured to use the time slice information to determine one or more similar objects relative to the target object. In some embodiments, the set of video frames, of the video data, that includes the target object is determined using the time slice information corresponding to the target object. At least one video frame in the set of video frames is used to search for similar objects relative to the target frame from a similar object library, which includes information corresponding to objects that are candidate similar objects to the target object. One or more similar objects are determined from the similar object library. In some embodiments, mappings between target objects and information pertaining to the one or more similar objects relative to the corresponding target objects are stored by server 106 in database 108. For example, information pertaining to the one or more similar objects relative to the target object includes images of the similar object(s), information on how/where to purchase the similar object(s), and/or link information to websites that sell the similar object(s).

Device 102 is configured to receive a plurality of video frames and play the plurality of video frames. For example, the plurality of video frames is from a video file or a video stream. In some embodiments, playing the plurality of video frames includes causing a media player application to launch at device 102 and play the plurality of video frames. In some embodiments, the plurality of video frames that is being played at device 102 was sent from server 106. In some embodiments, in addition to the plurality of video frames, device 102 also receives time slice information corresponding to one or more target objects that appear in the plurality of video frames and also information on similar object(s) relative to the target object(s) from server 106. In some embodiments, mappings between information on similar object(s) pertaining to various target object(s) associated with the plurality of video frames are stored at database server 108. As the plurality of video frames is playing (e.g., by the media player application) at device 102, device 102 is configured to compare the current playback information (e.g., the current number of minutes and/or seconds from the beginning of the video file) associated with the plurality of video frames to the time slice information of each of one or more target objects associated with the plurality of video frames. If the current playback information is within the range of the time period within the plurality of video frames that is specified by the time slice information corresponding to a target object associated with the plurality of video frames, device 102 is configured to present information on one or more similar objects relative to that target object at device 102. In some embodiments, the information on one or more similar objects relative to that target object is presented in a manner that is concurrent with the playing of the plurality of video frames. For example, the information on one or more similar objects relative to that target object are presented in a manner that overlays the playing of the plurality of video frames of a video file within the media player application while the video file is still being played within the media player application.

In some embodiments, if time information corresponding to one or more target objects that appear in the plurality of video frames is not sent to device 102, device 102 is configured to periodically send current playback/progress information associated with the playing of the plurality of video frames to server 106. Server 106 is configured to compare the received current playback information associated with the playing of the plurality of video frames to time slice information corresponding to one or more target objects associated with the plurality of video frames to determine whether the current playback information is within the range of the time period within the plurality of video frames that is specified by the time slice information corresponding to a target object associated with the plurality of video frames. If the current playback information is within the range of the time period within the plurality of video frames that is specified by the time slice information corresponding to a target object associated with the plurality of video frames, server 106 is configured to obtain information on one or more similar objects relative to the target object and to send such information to device 102, where device 102 is configured to present the information in a manner that overlays the playing of the plurality of video frames at device 102.

As described with the example of system 100, time slice information corresponding to target objects that appear in a plurality of video frames is determined and then used to determine corresponding similar object information for the target objects. Mappings between time slice information of target objects and the target objects' corresponding similar objects are stored. During a playback of the plurality of video frames at a device, the current progress/playback information of the plurality of video frames is (e.g., repeatedly, periodically) compared to the time slice information of target objects that appear in the video. When the current progress/playback information of the plurality of video frames falls within the time slice information of target objects, stored information on similar objects relative to the target objects is obtained and presented at the device so that the viewer of the plurality of video frames can immediately be informed of similar objects to those they see in the video, as they continue to view the video. For example, information on the similar objects may be presented as bullet screen messages across the media player application as the application continues to play the video file. For example, a target object may be a target product and similar objects relative to that target object may be products that are similar to the target product.

Figure 2:
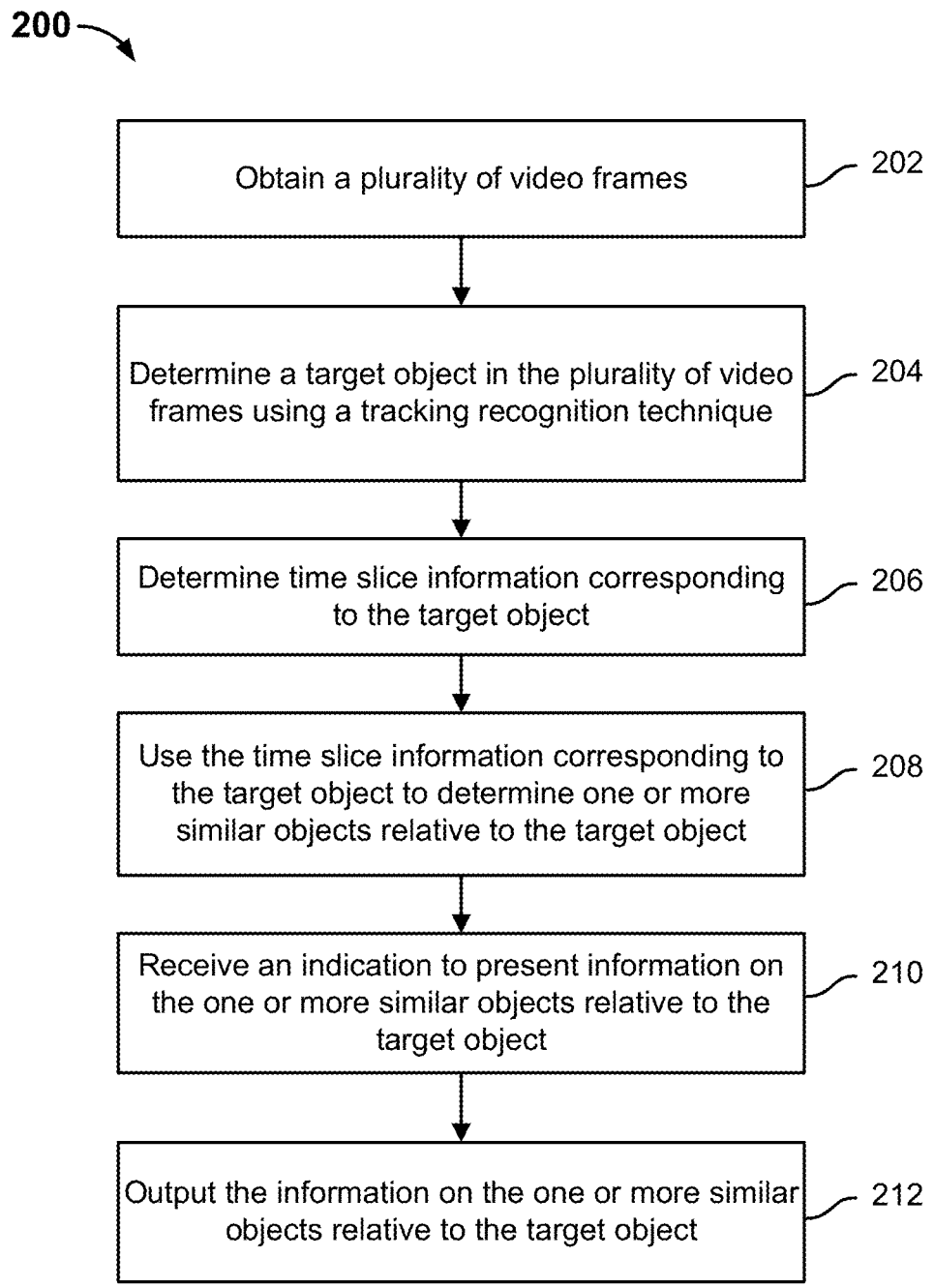
FIG. 2 is a flow diagram showing an embodiment of a process for determining information on similar objects relative to a target object.

FIG. 2 is a flow diagram showing an embodiment of a process for determining information on similar objects relative to a target object. In some embodiments, process 200 is implemented at server 106 of system 100 of FIG. 1.

At 202, a plurality of video frames is obtained.

The plurality of video frames is from a video file or a video stream. The video file or the video stream may be in any file format. There are one or more target objects that appear in at least one video frame of the plurality of video frames. Examples of target objects in a plurality of video frames include clothing, bags, and other merchandise. As will be described in further detail below, the appearance of target objects in the plurality of video frames will trigger presentation of information on similar objects while the plurality of video frames is being played (e.g., by a media player application).

For example, the video file may be a live stream video, a prerecorded video, a performance video, and a travel video.

At 204, a target object in the plurality of video frames is determined using a tracking recognition technique.

In some embodiments, one or more target objects may be programmatically identified (e.g., using any appropriate detection technique) in the video frames of the plurality of video frames. In some embodiments, images of target objects to be detected in a plurality of video frames are input by a user. For example, target objects may include persons or items that appear in one or more video frames of the plurality of video frames. For example, if the plurality of video frames is an episode of a television series, both the coat and shoes worn by an actor who appears in the video frames of the episode may be determined as target objects.

After a target object has been detected in a video frame, the target object is programmatically tracked (e.g., using any appropriate tracking technique) through the other video frames.

In a specific example, multiple target tracking recognition is applied to each video frame of the plurality of video frames to determine spatial localization information of the target objects, if any, in the plurality of video frames. The spatial localization information may refer to the spatial trajectory of a target object in a plurality of video frames. Specifically, the "spatial localization information" of a target object may refer to the video frames where the target object appears, from the start frame to the end frame.

In some embodiments, after a target object in a plurality of video frames is determined, identification information may be set for the target object. In some embodiments, the target object identification information of a target number may be a value (e.g., a numerical value). For example, target object identification information of target objects detected in a plurality of video frames may be set in the order in which the target objects had been detected in the plurality of video frames. For example, if the first detected target object in a video file (e.g., the target object that appears chronologically first in a video file) is a sweater, the identification information set for the target object may be "1."

For example, the target object is a piece of merchandise, a piece of apparel, and/or a geographic location.

At 206, time slice information corresponding to the target object is determined.

In various embodiments, the "time slice information" corresponding to a target object refers to the start time to the end time of a video segment that includes a set of video frames that show the target object. For example, if the target object is a piece of clothing, and if video frames containing this piece of clothing are frame 15 through frame 100, the time slice corresponding to this piece of clothing is the time segment of the plurality of video frames from the timestamp of frame 15 to the timestamp of frame 100. In various embodiments, the "timestamp" refers to the play time of the video frame. In various embodiments, the time slice information corresponding to a target object is stored.

For example, the spatial localization information of a target object is used to determine the time slice information corresponding to the target object. After the spatial localization information for the target object in the video frames is obtained, the spatial localization information is used to determine the timestamp information for the video frames that show the target object, from the start video frame to the end video frame. The start video frame and the end video frame are then used to determine the time slice information corresponding to the target object. For example, the target object is a sweater, and if the sweater appears from frame 15 to frame 100 of a plurality of video frames, the spatial localization information for this sweater in the plurality of video frames is established as being from frame 15 to frame 100. Then, on the basis of the spatial localization information, the time slice information of this sweater can be determined as the video segment of the plurality of video frames from the timestamp of frame 15 to the timestamp of frame 100.

At 208, the time slice information corresponding to the target object is used to determine one or more similar objects relative to the target object.

In various embodiments, a "similar object" refers to an object that is similar to a target object. For example, if the target object is a bag, the similar object may be a bag of a similar style. For example, the similarity between a candidate object and a target object is determined based on the closeness/similarity of their appearance features (e.g., color, size, material, brand) and/or other attribute features (e.g., price, availability). For example, information on one or more similar objects relative to the target object includes identification information of the target object, identification information of the similar object(s), information on how to buy the similar object(s), information on where to buy the similar object(s), and link information to a website that is selling the similar object(s).

At 210, an indication to present information on the one or more similar objects relative to the target object is received.

In some embodiments, an indication to present information on the one or more similar objects relative to the target object is received when the plurality of video frames is being played. For example, the video file is being played at a device (e.g., in response to a user operation to play the video file).

At 212, information on the one or more similar objects relative to the target object is outputted.

In some embodiments, information on one or more similar objects relative to the target object is sent/output to the device that is playing (or will play) the plurality of video frames. For example, when the current playback of the video file falls within the time slice information corresponding to the target object, the information on one or more similar objects relative to the target object is caused to be presented at the display of the device that is playing the video.

Figure 3:
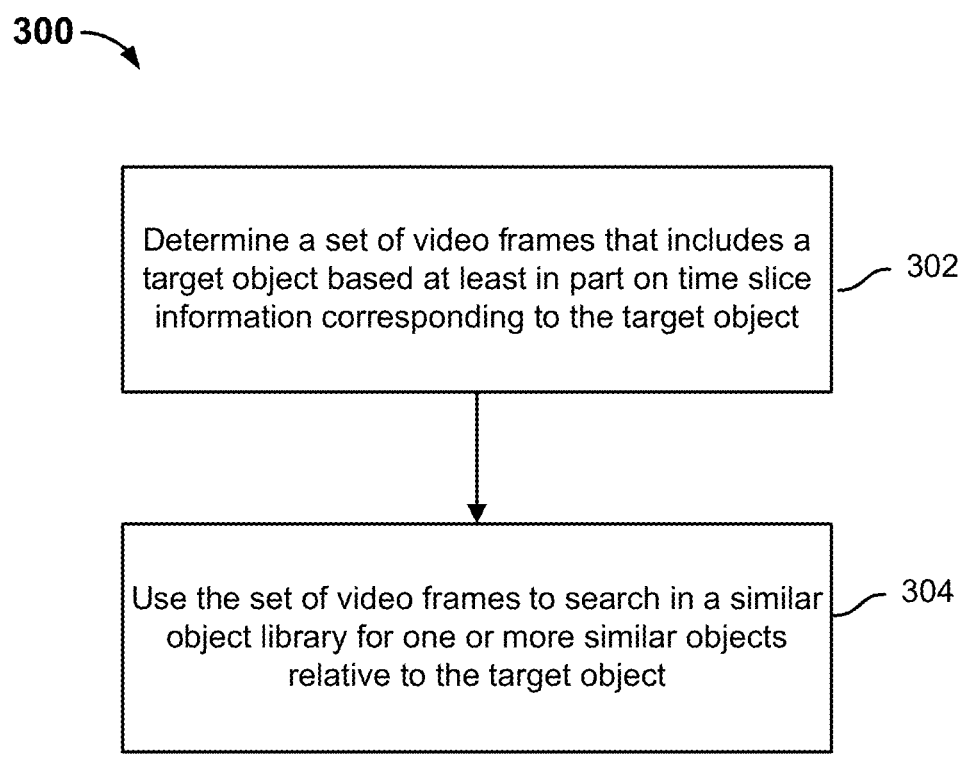
FIG. 3 is a flow diagram showing an example of a process for determining one or more similar objects relative to a target object.

FIG. 3 is a flow diagram showing an example of a process for determining one or more similar objects relative to a target object. In some embodiments, step 208 of process 200 of FIG. 2 may be implemented using process 300. In some embodiments, process 300 is implemented at server 106 of system 100 of FIG. 1.

At 302, a set of video frames that includes a target object is determined based at least in part on time slice information corresponding to the target object. The time slice information corresponding to the target object includes the start timestamp (i.e., the first time that the target object appears in the video file) and also the last timestamp (i.e., the last time that the target object appears in the video file) of the target object. Therefore, the set of video frames of the video file that includes the target object includes the video frame that corresponds to the start timestamp and the video frame that corresponds to the last timestamp and each video frame in between. For example, if a target object appears from frame 15 to frame 100 of a video file, the set of video frames that includes this target object includes all the video frames from frame 15 through frame 100.

At 304, the set of video frames is used to search in a similar object library for one or more similar objects relative to the target object. For example, a similar object library comprises a merchandise database which includes merchandise images, merchandise prices, merchandise descriptive information, and link information to websites/online platforms that sell merchandise.

Figure 4:
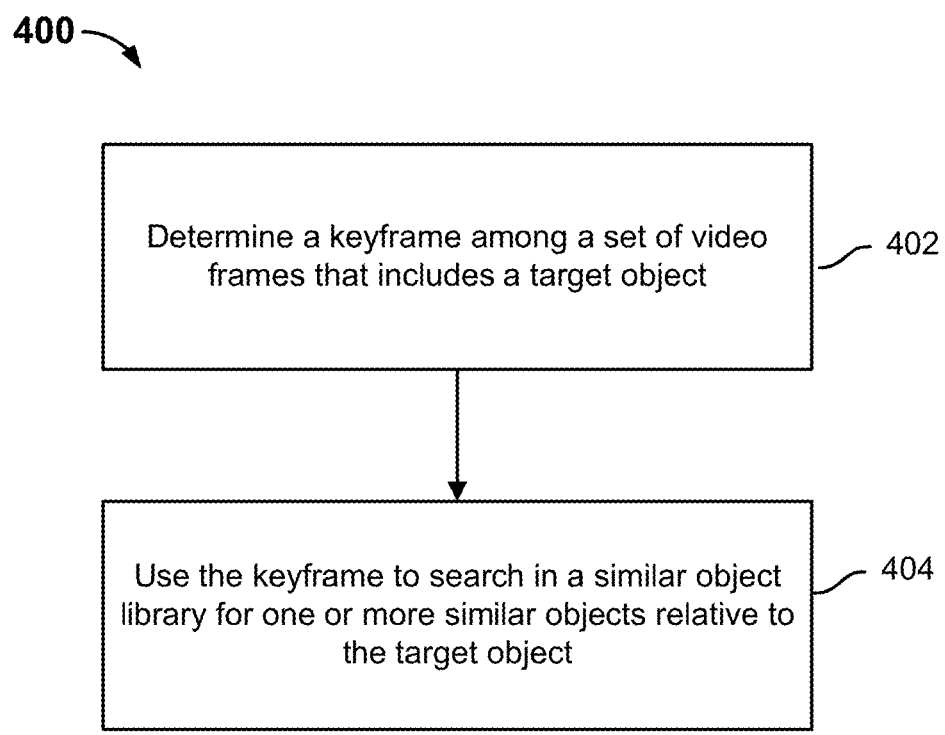
FIG. 4 is a flow diagram showing an example of a process for using a set of video frames to search for similar objects relative to a target object.

FIG. 4 is a flow diagram showing an example of a process for using a set of video frames to search for similar objects relative to a target object. In some embodiments, step 304 of process 300 of FIG. 3 may be implemented using process 400. In some embodiments, process 400 is implemented at server 106 of system 100 of FIG. 1.

At 402, a keyframe is determined among a set of video frames that includes a target object. In some embodiments, one video frame out of the set of video frames that includes a target object is selected as the "keyframe" of the target object.

At 404, the keyframe is used to search in a similar object library for one or more similar objects relative to the target object. The "keyframe" includes a representative image of the target object and is to be used as reference for the target object in searching through the similar object library for similar objects. For example, in some implementations, using the keyframe to search for similar objects relating to the target object in a similar object library may refer to importing keyframe graphic data into an interface for searching for similar objects relating to the target object in a similar object library. A search system may obtain keyframe feature data through deep learning based on the keyframe graphic data and uses the feature data from the keyframe to search for similar objects in the similar object library.

Figure 5:
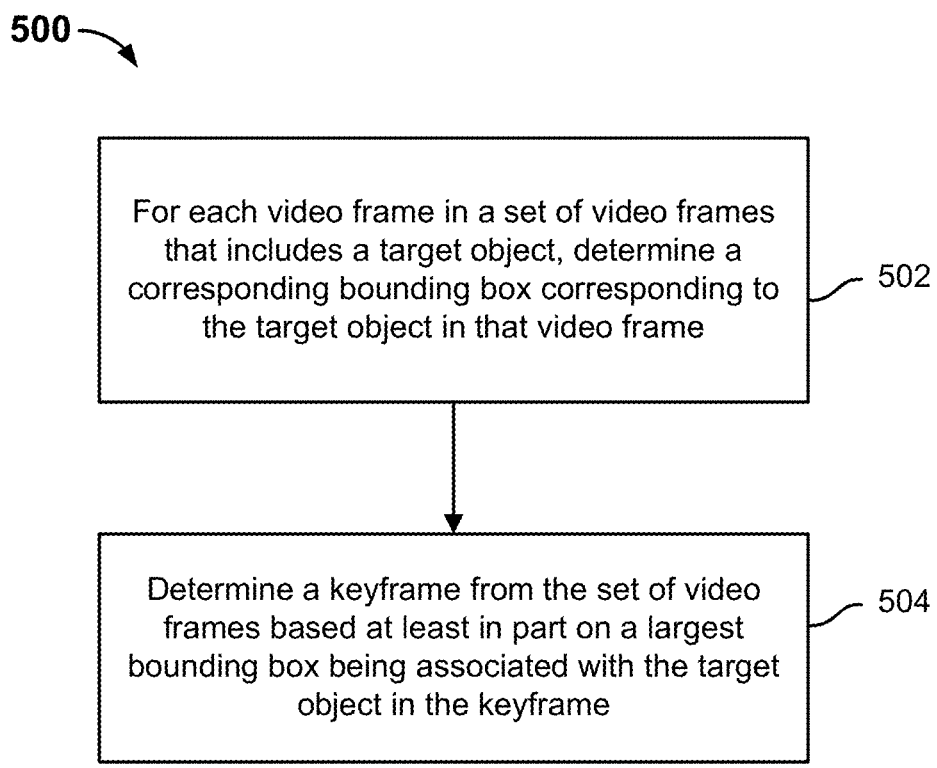
FIG. 5 is a flow diagram showing an example of a process for using a set of video frames to search for similar objects relative to a target object.

FIG. 5 is a flow diagram showing an example of a process for using a set of video frames to search for similar objects relative to a target object. In some embodiments, step 404 of process 400 of FIG. 4 may be implemented using process 500. In some embodiments, process 500 is implemented at server 106 of system 100 of FIG. 1.

At 502, for each video frame in a set of video frames that includes a target object, a corresponding bounding box corresponding to the target object in that video frame is determined. In some embodiments, a bounding box in two dimensions is determined for the appearance of the target object in each video frame of a set of video frames in which the target object appears.

At 504, a keyframe is determined from the set of video frames based at least in part on a largest corresponding bounding box being associated with the target object in the keyframe. The video frame of the set of video frames that includes the largest bounding box (e.g., the bounding box with the greatest area) is determined to be the keyframe associated with the target object for the plurality of video frames.

In another example, the "keyframe" of a target object may be the video frame with the clearest graphics. In yet another example, the "keyframe" of a target object may be multiple frames that include large bounding boxes or relatively clear graphics.

Because the graphic quality of the target object image is better in the keyframe than in other frames containing the target object, and because the area of the target object image contained in the keyframe is larger, similar objects relating to the target object are obtained more efficiently in searches in the similar object library using the keyframe. In addition, the similar objects that are found using a better-quality image of the target object are determined to have a higher degree of similarity to the target object.

In some embodiments, mappings between a target object and its determined similar objects are stored. In a first example, such mappings include storing information on similar objects relative to a target object with identifying information (e.g., the timestamps(s)) of the keyframe of the target object. In a second example, such mappings include storing information on similar objects relative to a target object with identifying information (e.g., the timestamps(s)) of the target object.

In some embodiments, steps 202 through 208 of process 200 of FIG. 2, process 300 of FIG. 3, process 400 of FIG. 4, and process 500 of FIG. 5 are offline operations in that they can be performed on video files before video files are requested to be played on devices. As offline operations, the processes may be performed using sensitive detection and tracking techniques to achieve high quality analysis of target objects that are present in the video files. The analysis of target objects that are present in the video files is then used to obtain similar object information relative to the target objects. Mappings between target objects and their similar objects may be stored in a database for subsequent use. As will be described in further detail below, when the video files are played online, the time slice information of the target objects that are present in those video files is used to determine when, during the playback of the video files, to present information on similar objects relative to the target objects.

Figure 6:
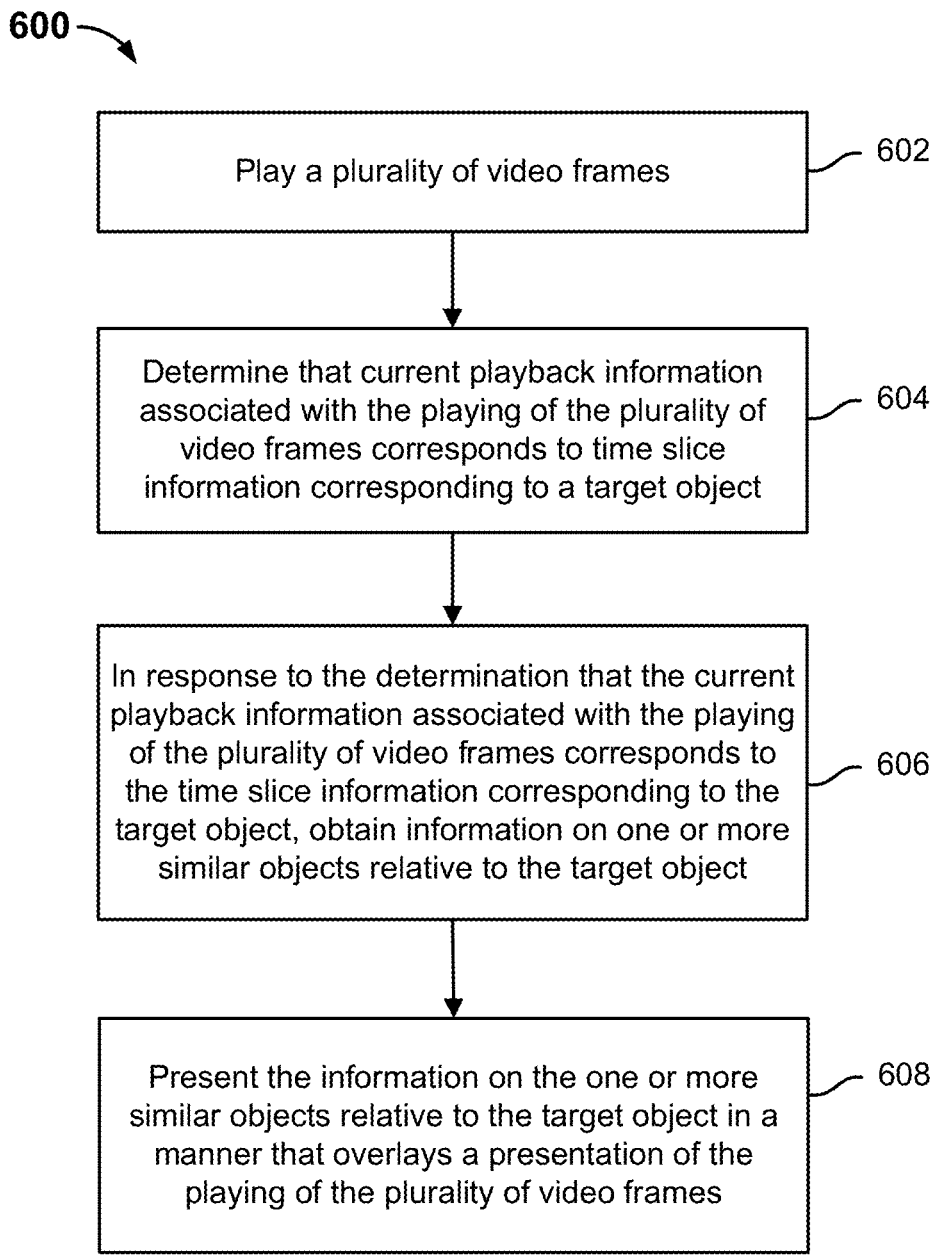
FIG. 6 is a flow diagram showing an embodiment of a process for presenting information on similar objects relative to a target object.

FIG. 6 is a flow diagram showing an embodiment of a process for presenting information on similar objects relative to a target object. In some embodiments, process 600 is implemented at device 102 of system 100 of FIG. 1.

At 602, a plurality of video frames is played.

In some embodiments, in response to a user operation received at the device, the plurality of video frames is downloaded from a server (e.g., server 106 of system 100 of FIG. 1 or another server). In some embodiments, the plurality of video frames is played by a media player application executing at the device.

At 604, current playback information associated with the playing of the plurality of video frames is determined to correspond to time slice information corresponding to a target object.

In some embodiments, the time slice information (e.g., the range of timestamps in the video file) of each target object that appears in the plurality of video frames is also downloaded from a server (e.g., server 106 of system 100 of FIG. 1). The current playback information of (e.g., the current time into) the plurality of video frames is periodically compared to the time slice information of each target object that appears in the plurality of video frames.

At 606, in response to the determination that the current playback information associated with the playing of the plurality of video frames corresponds to the time slice information corresponding to the target object, information on one or more similar objects relative to the target object is obtained. When the current playback information of the plurality of video frames corresponds to (e.g., falls within) the time slice information of a target object that appears in the plurality of video frames, information on similar objects relative to the target object is obtained. When the current playback information of the plurality of video frames corresponds to (e.g., falls within) the time slice information of a target object, it means that the target object can be seen in the playing plurality of video frames.

In some embodiments, information on similar objects relative to the target object is queried from the server. In some embodiments, information on similar objects relative to all target objects that appear in a plurality of video frames has already been downloaded with the plurality of video frames and the set of information on similar objects relative to the specific target object for which the current playback information associated with the playing of the plurality of video frames corresponds to the time slice information is then retrieved locally at the device.

In some embodiments, information on similar objects relative to the target object is obtained based on a keyframe within the time range of the time slice information corresponding to the target object. In some embodiments, the keyframe of the target object is used to dynamically search for similar objects (e.g., in a similar object library) in response to the determination that the current playback information associated with the playing of the plurality of video frames corresponds to the time slice information corresponding to the target object. In some embodiments, the keyframe of the target object is used to look up previously stored mappings between similar objects corresponding to the target object.

As described above, the time slice information corresponding to a target object refers to the start time to the end time of a video segment of a plurality of video frames that includes video frames containing the target object. For example, if the video frames containing Target Object A are frame 15 through frame 100, the time slice is the time range from the timestamp of frame 15 to the timestamp of frame 100. When the current playback of the playing of the plurality of video frames progresses to the timestamp corresponding to frame 20, then it is determined that the current playback information corresponds to the time slice information of Target Object A and therefore, similar objects relative to Target Object A are obtained.

The similar object(s) refer to object(s) that are similar to the target object. For example, if the target object is a bag, the similar object may be a bag of a similar style.

In the event that there are multiple target objects that simultaneously exist in a single video frame, it is possible to obtain similar objects relating to multiple target objects in response to the determination that the current playback information associated with the playing of the plurality of video frames corresponds to the time slice information corresponding to those multiple target objects. For example, one video frame may have three target objects: a sweater, a pair of pants, and a hat. Thus, similar objects may be obtained for each of the three target objects.

At 608, the information on the one or more similar objects relative to the target object is presented in a manner that overlays a presentation of the playing of the plurality of video frames.

In some embodiments, information on the one or more similar objects relative to the target object is presented in a manner that overlays the plurality of video frames (e.g., a video file) as it continues to play. For example, information on the one or more similar objects relative to the target object is concurrently presented over the video file as the video file continues to play within a media player application.

In some embodiments, prior to presenting information on the one or more similar objects relative to the target object, user historical behavior information and interest information of the user that is viewing the plurality of video frames are compared to information on the similar objects to determine whether there is a match. If there is a match, information on the one or more similar objects relative to the target object is presented. Otherwise if there is no match, information on the one or more similar objects relative to the target object is not presented.

If a large number of similar objects (e.g., there is greater than a predetermined number of similar objects) relative to a target object is found, the similar objects may be ranked according to their respective degrees of similarity with respect to the target object to obtain ranked similar objects. Then, information on a preset number of the top ranked similar objects relative to the target object is presented.

For example, if ten pieces of similar merchandise (i.e., similar objects) are found, but only three similar pieces may be displayed according to the setting, the similar objects may be ranked according to their respective degrees of similarity relative to the target object. Information on the top three of the ranked similar pieces of merchandise is then presented on the display screen.

In some embodiments, the information on the one or more similar objects relative to the target object is presented as bullet screen messages on the display screen (e.g., within the media player application) of the device. Bullet screen messages are messages that move across the display screen, temporarily, and in a way that overlays media (e.g., video) content that is playing.

Figure 7:
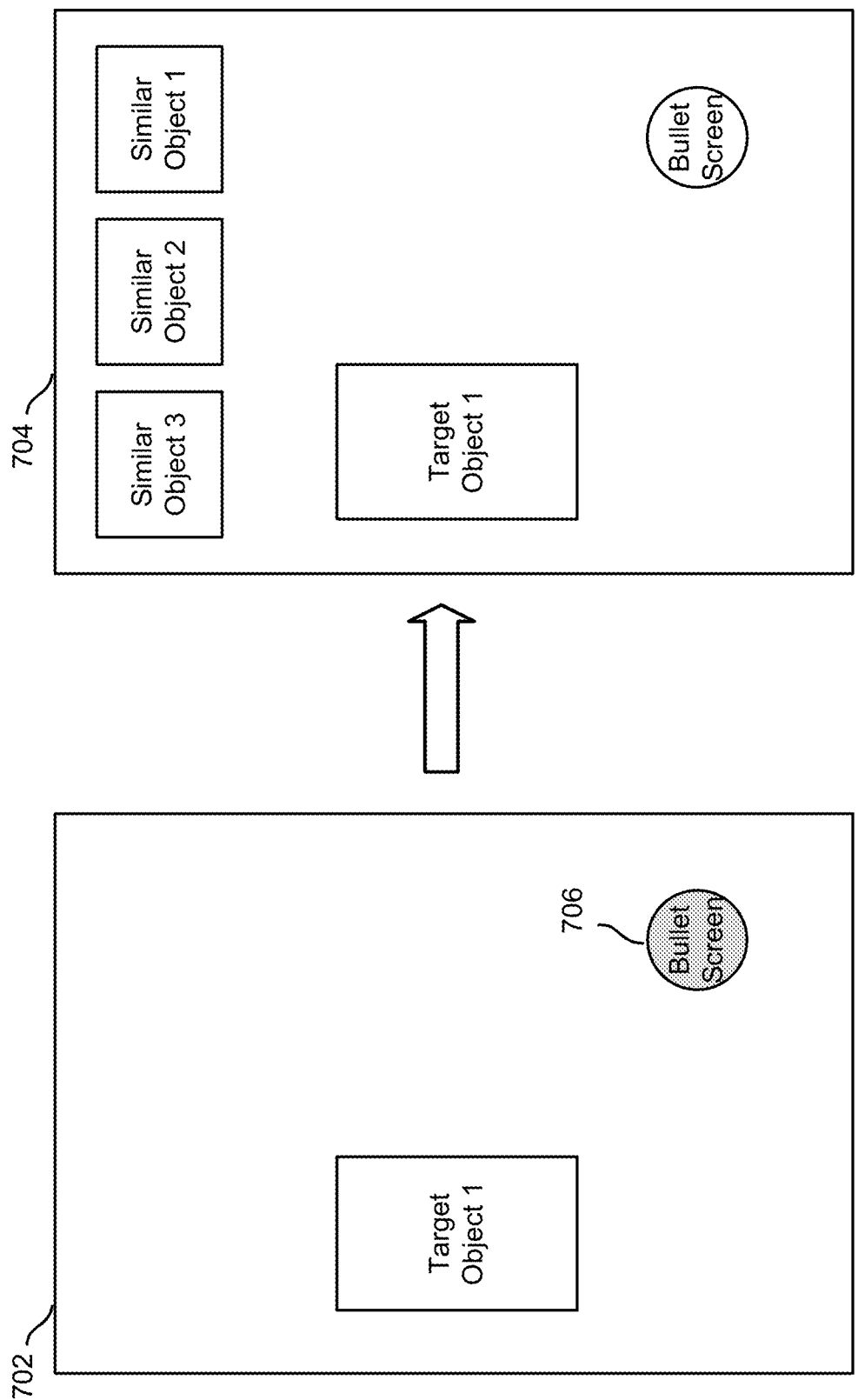
FIG. 7 is a diagram showing an example of a single target object appearing in a video file that is being played at a display screen and presenting similar object information in response to a user trigger operation.
Figure 8:
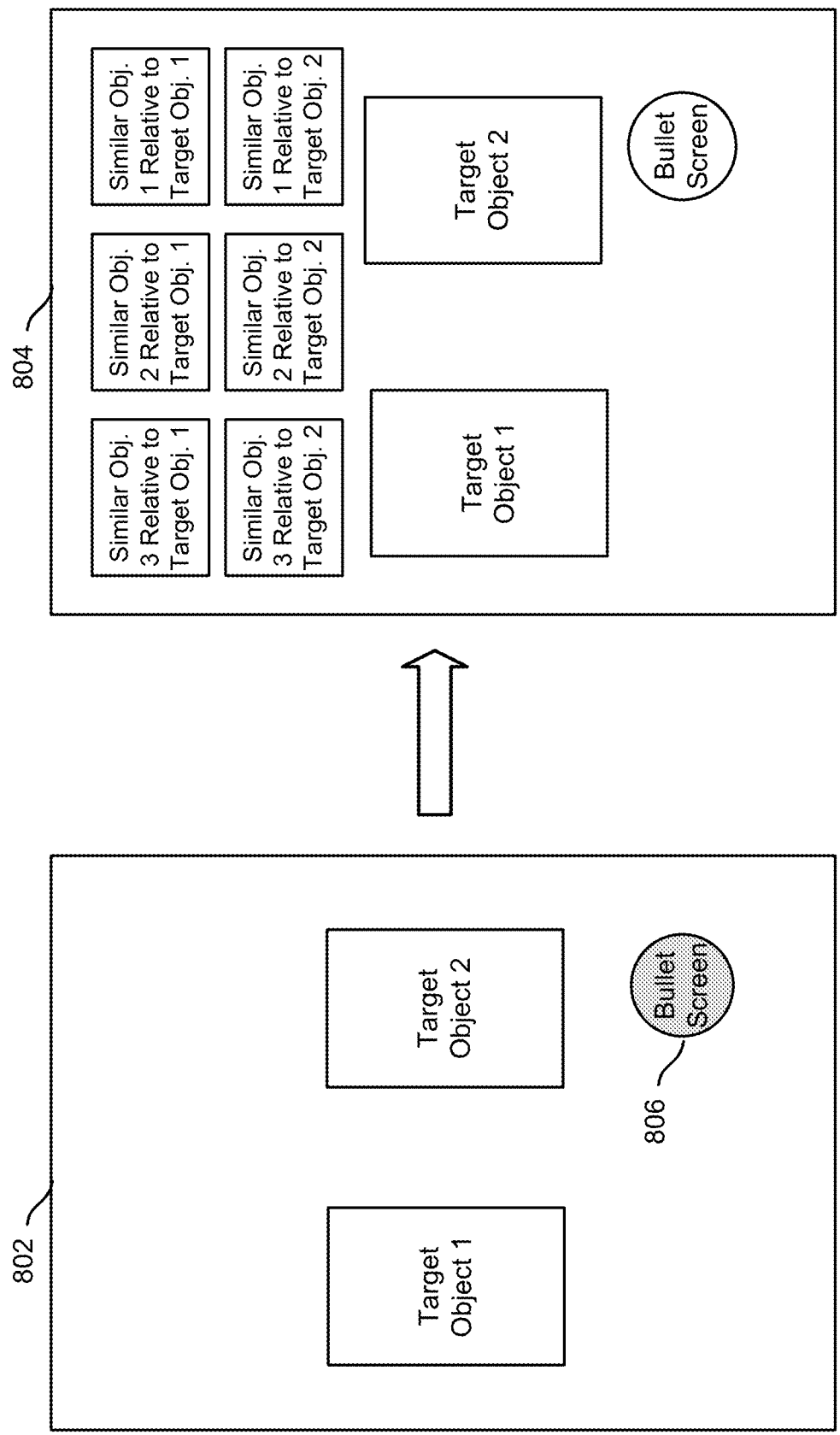
FIG. 8 is a diagram showing an example of multiple target objects appearing in a video file that is being played at a display screen and presenting similar object information in response to a user trigger operation.

In some embodiments, there are two ways to present similar objects as bullet screen messages on a display screen. The first approach is the trigger operation: the user actively triggers presentation of information on the similar objects, and the media player application receives the user trigger operation to present similar objects as bullet screen messages. In accordance with the user trigger operation, the similar objects are presented as bullet screen messages on the display screen. FIGS. 7 and 8, below, describe examples of presenting similar objects as bullet screen messages on a display screen based on the user trigger operation.

FIG. 7 is a diagram showing an example of a single target object appearing in a video file that is being played at a display screen and presenting similar object information in response to a user trigger operation. "Bullet screen" button 706 is displayed on the display screen 702 (e.g., which is part of a media player application). After the user selects (i.e., triggers) "Bullet screen" button 706, information on similar objects (Similar Objects 1, 2, and 3) relative to Target Object 1 that had appeared at display screen 702 is presented in display screen 704. In some embodiments, Target Object 1 in the current playback of the video file is also highlighted in a way that shows that "Bullet screen" button 706 is associated with it. Information on Similar Objects 1, 2, and 3 can be presented in a bullet screen message manner, meaning that the information flies across display screen 704 and in a manner that overlays the video frames of the video file that are currently being presented at display screen 704. The effect of presenting "Bullet screen" button 706 at display screen 702 when Target Object 1 had been visible in the current playback of the video file is that a user can select "Bullet screen" button 706 to immediately trigger information on similar objects relative to Target Object 1 to be presented over the current playback of the video file such that the user can receive immediate feedback on his or her interest in Target Object 1 in the video, without needing to pause or stop the video file to manually perform a search (e.g., on a separate web browser application).

FIG. 8 is a diagram showing an example of multiple target objects appearing in a video file that is being played at a display screen and presenting similar object information in response to a user trigger operation. "Bullet screen" button 806 is displayed on the display screen 802 (e.g., which is part of a media player application). After the user selects (i.e., triggers) "Bullet screen" button 806, information on similar objects (Similar Object 1, 2, and 3 relative to Target Object 1) relative to Target Object 1 and information on similar objects (Similar Object 1, 2, and 3 relative to Target Object 2) relative to Target Object 2 that had appeared at display screen 802 are presented in display screen 804. In some embodiments, Target Object 1 and Target Object 2 in the current playback of the video file are also highlighted in a way that shows that "Bullet screen" button 806 is associated with them. Information on Similar Objects 1, 2, and 3 Relative to Target Object 1 and Similar Objects 1, 2, and 3 Relative to Target Object 2 can be presented in a bullet screen message manner, meaning that the information flies across display screen 804 and in a manner that overlays the video frames of the video file that are currently being presented at display screen 804. The effect of presenting "Bullet screen" button 806 at display screen 802 when Target Object 1 and Target Object 2 had been visible in the current playback of the video file is that a user can select "Bullet screen" button 806 to immediately trigger information on similar objects respectively relative to Target Object 1 and Target Object 2 to be presented over the current playback of the video file such that the user can receive immediate feedback on his or her interest in Target Object 1 and Target Object 2 in the video, without needing to pause or stop the video file to manually perform a search (e.g., on a separate web browser application).

In some embodiments, the second approach to presenting information on similar objects relative to a target object is to present such information at the display screen in response to a determination that the current playback of the video file corresponds to the time slice information corresponding to the target object without any user intervention (e.g., without requiring a user to trigger such a presentation by selecting a button). As such, after a video file is played to within the time range of the time slice information corresponding to the target object, similar objects relating to the target object in the video file are obtained and then directly presented on a display screen.

Figure 9:
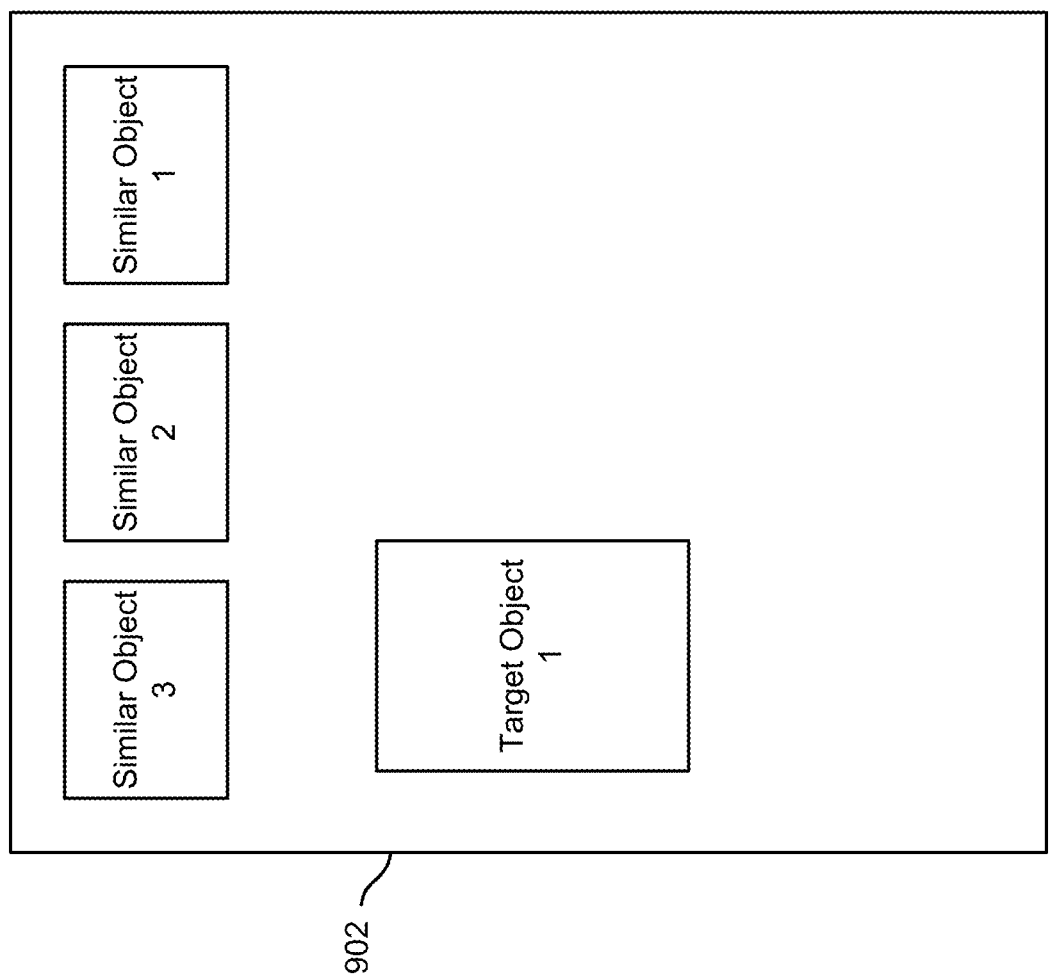
FIG. 9 is a diagram showing an example of a single target object appearing in a video file that is being played at a display screen and directly presenting similar object information.

FIG. 9 is a diagram showing an example of a single target object appearing in a video file that is being played at a display screen and directly presenting similar object information. As shown in the example of FIG. 9, after Target Object 1 appears during the current playback of the video file, information on its corresponding similar objects (Similar Objects 1, 2, and 3) is directly presented as bullet screen messages in real time on display screen 902 without requiring the user to first select a button.

Figure 10:
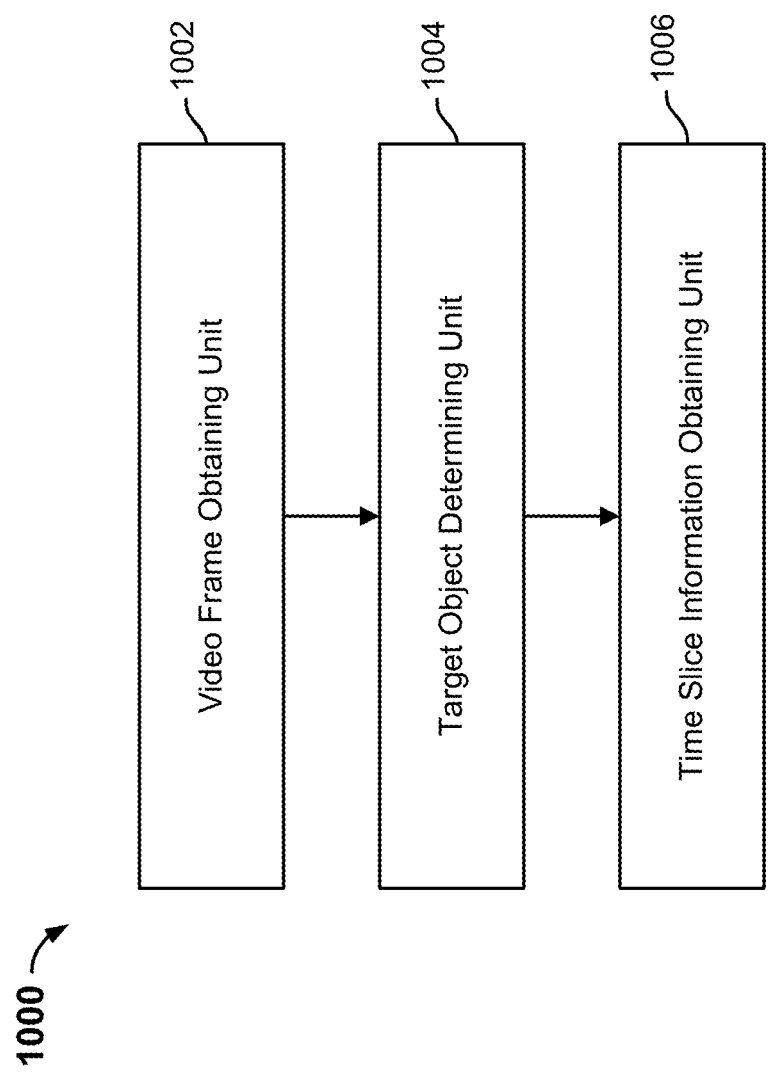
FIG. 10 is a diagram showing an embodiment of a server for determining similar object information relative to a target object of a plurality of video frames.

FIG. 10 is a diagram showing an embodiment of a server for determining similar object information relative to a target object of a plurality of video frames. As shown in FIG. 10, system 1000 includes video frame obtaining unit 1002, target object determining unit 1004, and time slice information obtaining unit 1006.

The modules, sub-modules, and units described herein can be implemented as software components executing on one or more processors, as hardware such as programmable logic devices, and/or as Application Specific Integrated Circuits designed to elements that can be embodied by a form of software products which can be stored in a non-volatile storage medium (such as optical disk, flash storage device, mobile hard disk, etc.), including a number of instructions for making a computer device (such as personal computers, servers, network equipment, etc.) implement the methods described in the embodiments of the present disclosure. The modules, sub-modules, and units may be implemented on a single device or distributed across multiple devices.

Video frame obtaining unit 1002 is configured to obtain a plurality of video frames.

Target object determining unit 1004 is configured to determine a target object in the plurality of video frames using a tracking recognition technique.

Time slice information obtaining unit 1006 is configured to determine time slice information corresponding to the target object and use the time slice information to obtain similar objects relating to the target object.

In some embodiments, time slice information obtaining unit 1006 is further configured to obtain spatial localization information of the target object in the video frames and obtain time slice information corresponding to the target object based on the spatial localization information.

In some embodiments, system 1000 further comprises:

A similar object searching unit that is configured to use the time slice information corresponding to the target object to search for similar objects relating to the target object.

In some embodiments, the similar object searching unit is further configured to determine video frames of a video segment containing the target object based on time slice information corresponding to the target object and use the video frames of the video segment containing the target object to search for similar objects relating to the target object in a similar object library.

In some embodiments, system 1000 further comprises:

A keyframe determining unit that is configured to determine a keyframe of the video segment containing the target object based on the time slice information.

The similar object searching unit is further configured to use a target object detected in the keyframe to search for similar objects relating to the target object in a similar object library.

In some embodiments, the keyframe determining unit is further configured to use the time slice information as a basis to select from video frames in a video segment containing the target object the video frame in which the target object has the largest bounding box. In some embodiments, the video frame in which the target object has the largest bounding box is selected as the keyframe corresponding the target object.

In some embodiments, system 1000 further comprises:

An information storage unit is configured to store timestamp information of the keyframe or identification information of the target object contained in the keyframe.

In some embodiments, system 1000 further comprises:

An information storage unit is configured to store the similar objects in correspondence with the keyframe timestamp information or identification information of the target object contained in the keyframe in a database.

Figure 11:
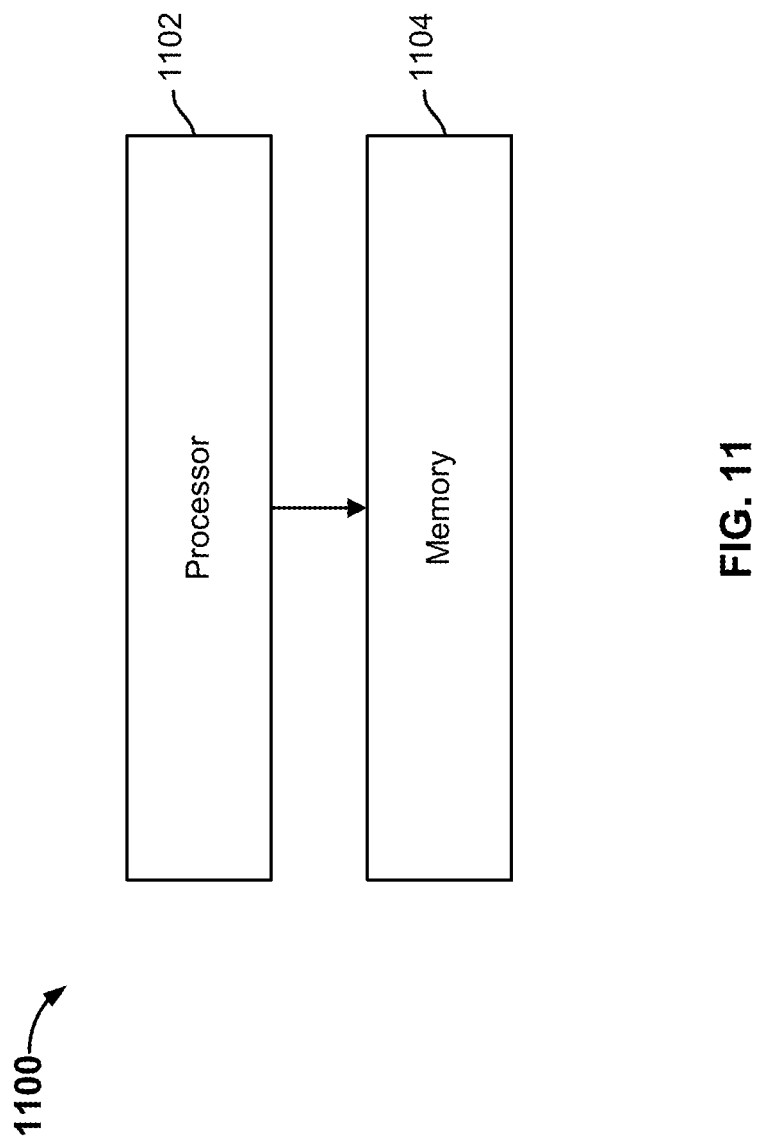
FIG. 11 is a diagram showing an embodiment of a system for determining similar object information relative to a target object of a plurality of video frames.

FIG. 11 is a diagram showing an embodiment of a system for determining similar object information relative to a target object of a plurality of video frames. As shown in FIG. 11, system 1100 includes processor 1102 and memory 1104.

Memory 1104 is configured to store a data processing method program. After system 1100 is powered up and runs the data processing method program through processor 1102, processor 1102 is configured to obtain a plurality of video frames, determine a target object in the plurality of video frames using a tracking recognition technique, determine time slice information corresponding to the target object, and use the time slice information to obtain similar objects relating to the target object.

In some embodiments, determining time slice information corresponding to the target object comprises obtaining spatial localization information of the target object in the video frames and obtaining time slice information corresponding to the target object based on the spatial localization information.

In some embodiments, processor 1102 is further configured to use the time slice information corresponding to the target object to search for similar objects relating to the target object. In some embodiments, the using time slice information corresponding to the target object to search for similar objects relating to the target object comprises determining video frames of a video segment containing the target object based on time slice information corresponding to the target object and using the video frames of the video segment containing the target object to search for similar objects relating to the target object in a similar object library.

In some embodiments, processor 1102 is further configured to determine a keyframe of the video segment containing the target object based on the time slice information. In some embodiments, the using the time slice information corresponding to the target object to search for similar objects relating to the target object in a similar object library comprises: using a target object detected in the keyframe to search for similar objects relating to the target object in a similar object library. In some embodiments, the determining a keyframe of the video segment containing the target object based on the time slice information comprises using the time slice information as a basis to select from video frames in a video segment containing the target object the video frame in which the target object has the largest bounding box. In some embodiments, the video frame in which the target object has the largest bounding box is selected as the keyframe corresponding to the target object.

In some embodiments, processor 1102 is further configured to store timestamp information of the keyframe or identification information of the target object contained in the keyframe.

In some embodiments, processor 1102 is further configured to store the similar objects in correspondence with the keyframe timestamp information or identification information of the target object contained in the keyframe in a database.

In some embodiments, memory 1104 is configured to store a data processing method program that corresponds to a data processing method that when executed by processor 1102, processor 1102 is configured to obtain a plurality of video frames, determine a target object in the plurality of video frames using a tracking recognition technique, determine time slice information corresponding to the target object, and use the time slice information to obtain similar objects relating to the target object.

FIG. 12 is a diagram showing an embodiment of a system for presenting similar object information relative to a target object of a plurality of video frames. As shown in FIG. 12, system 1200 includes similar object obtaining unit 1202 and similar object presenting unit 1204.

Similar object obtaining unit 1202 is configured to play a plurality of video frames. Similar object obtaining unit 1202 is further configured to determine that current playback information associated with the playing of the plurality of video frames corresponds to the time range of time slice information corresponding to a target object and that in response to that determination, obtain similar objects relative to the target object in the plurality of video frames.

Similar object presenting unit 1204 is configured to present information on similar objects relative to the target object on a display screen.

In some embodiments, similar object obtaining unit 1202 is further configured to obtain similar objects relative to the target object based on the time slice information corresponding to the target object.

In some embodiments, similar object obtaining unit 1202 is further configured to obtain similar objects relating to the target object based on the keyframe within the time range of the time slice information corresponding to the target object.

In some embodiments, similar object obtaining unit 1202 is further configured to use the keyframe within the time range of the time slice information to search in a similar object library for similar objects relating to the target object.

In some embodiments, similar object obtaining unit 1202 is further configured to look up, in a database, prestored correspondences between keyframes and similar objects to determine similar objects relating to the target object.

In some embodiments, similar object presenting unit 1204 is further configured to use user historical behavior information and interest information as a basis to assess whether the similar objects match user historical behavior information and interest information. Only if the user historical behavior information and interest information matches a similar object is information on the similar object presented on a display screen.

In some embodiments, system 1200 further comprises:

A ranking unit that is configured to rank the similar objects according to their respective degrees of similarity to obtain ranked similar objects.

In some embodiments, similar object presenting unit 1204 is further configured to present a preset display quantity of the top-ranked similar objects relative to a target object on a display screen.

In some embodiments, similar object presenting unit 1204 is further configured to present the similar objects as bullet screen messages on a display screen.

In some embodiments, similar object presenting unit 1204 is further configured to receive a user triggering operation for presenting similar objects as bullet screen messages and then in response to the user triggering operation, present information on the similar objects as bullet screen messages on a display screen.

In some embodiments, similar object presenting unit 1204 is further configured to present similar objects as bullet screen messages in real time on a display screen.

In some embodiments, system 1200 further comprises:

A descriptive information presenting unit that is configured to present the similar object descriptive information as bullet screen messages on a display screen.

FIG. 13 is a diagram showing an embodiment of a system for presenting similar object information relative to a target object of a plurality of video frames. As shown in FIG. 13, system 1300 includes processor 1302 and memory 1304.

Memory 1304 is configured to store a data processing method program. After system 1300 is powered up and runs the data processing method program through processor 1302, processor 1302 is configured to play a plurality of video frames; determine that current playback information associated with the playing of the plurality of video frames corresponds to the time range of time slice information corresponding to a target object, that in response to that determination, obtain similar objects relative to the target object in the plurality of video frames; and present information on similar objects relative to the target object on a display screen.

In some embodiments, the obtaining similar objects relating to a target object in the plurality of video frames comprises obtaining similar objects relating to the target object based on the time slice information corresponding to the target object.

In some embodiments, the obtaining similar objects relating to the target object based on the time slice information comprises obtaining similar objects relating to the target object based on a keyframe within the time range of the time slice information.

In some embodiments, the obtaining similar objects relating to the target object based on the keyframe within the time range of the time slice information comprises using the keyframe within the time range of the time slice information to search in a similar object library for similar objects relating to the target object.

In some embodiments, the obtaining similar objects relating to the target object based on the keyframe within the time range of the time slice information comprises using prestored correspondences between keyframes and similar objects to look up in a database similar objects relating to the target object.

The presenting the similar objects on a display screen comprises using user historical behavior information and interest information as a basis to assess whether the similar objects match user historical behavior information and interest information. Only if the user historical behavior information and interest information match a similar object is the similar object presented at a display screen.

In some embodiments, processor 1302 is further configured to rank the similar objects according to their respective degrees of similarity to a target object and present a preset display quantity of the top-ranked similar objects on a display screen. In some embodiments, the presenting the similar objects on a display screen comprises presenting the similar objects as bullet screen messages on a display screen.

In some embodiments, the presenting the similar objects as bullet screen messages on a display screen comprises receiving a triggering operation for presenting similar objects as bullet screen messages, and in accordance with the triggering operation, presenting the similar objects as bullet screen messages on a display screen.

In some embodiments, the presenting similar objects as bullet screen messages on a display screen comprises presenting similar objects as bullet screen messages in real time on a display screen.

In some embodiments, processor 1302 is further configured to present descriptive information of the similar objects as bullet screen messages on a display screen.

In some embodiments, a storage device is configured to store a data processing method program that corresponds to a data processing method described above. The program is run by a processor and executes when a plurality of video frames is played to within the time range of time slice information corresponding to a target object, obtaining similar objects relating to the target object in the plurality of video frames, and presenting the similar objects relating to the target object on a display screen.

A first example application of some embodiments described herein includes a video playing method comprising obtaining live stream video frames; determining a target object in the video frames; and presenting similar objects relating to the target object as bullet screen messages on a display screen. For example, when a presenter is conducting a video live stream and advertises an electric rice cooker in a particular video frame, the target object in the video frame is confirmed to be an image of an electric rice cooker, and some electric rice cooker images then appear at the top of the display screen. The user may click on an electric rice cooker image to make a purchase.

A second example application of some embodiments described herein includes a video playing method comprising obtaining a prerecorded plurality of video frames obtaining video frames of the plurality of video frames; determining a target object in the video frames; and presenting similar objects relating to the target object as bullet screen messages on a display screen. For example, a video-playing website is playing a television series. A target object in the current video frame is confirmed to be an actor's backpack. Backpacks similar to the backpack are then presented as bullet screen images on the display screen.

A third example application of some embodiments comprises a video playing method comprising a party video playing scenario. While the party video is being played, an image of a performer's apparel is obtained from a video frame, and images of apparel similar to the performer's apparel are presented as bullet screen messages on the display screen. By clicking or tapping on an image of similar apparel, the user may place an order for it.

A fourth example application of some embodiments comprises a video playing method comprising obtaining played video frames when a travel video is live streamed; determining travel scene-related target objects in the video frames; and presenting similar objects relating to the target object as bullet screen messages on a display screen. For example, played video frames are obtained when a travel video is live streamed. The travel scene is of people eating at a famous local snack bar. Thus, images of some distinctive, local snack bars or some brief text introductions to these snack bars may be presented on the display screen.

A fifth example application of some embodiments comprises a video playing method comprising obtaining video frames; determining the geographic location of a scene in the video frames; using the geographic location as a basis to determine to-be-recommended objects related to the geographic location; and presenting the to-be-recommended objects as bullet screen messages on a display screen. For example, played video frames are obtained when a travel video is played. If it is determined that the travel location is Korea, some Korean brands of cosmetics may be presented as bullet screen messages on the display screen.

A sixth example application of some embodiments comprises a video playing method comprising obtaining a plurality of video frames of store-displayed merchandise; determining merchandise displayed in video frames in the plurality of video frames; and presenting promotional merchandise similar to the displayed merchandise as bullet screen messages on a display screen. For example, when a brand's flagship store is displaying a new style of sweater, some promotional images of sweaters may be presented as bullet screen messages on the display screen.

Although the present application uses preferred embodiments to disclose the above, they are not used to limit the present application. Any person skilled in the art may make possible changes and modifications without departing from the spirit and scope of the present application. Therefore, the scope of protection of the present application shall be the scope delimited by the claims of the present application.

In a typical configuration, a computer device comprises one or more processors (CPUs), input/output ports, network interfaces, and memory.

Memory may include the following forms in computer-readable media: volatile memory, random-access memory (RAM), and/or non-volatile memory, e.g., read-only memory (ROM) or flash RAM. Memory is an example of a computer-readable medium.

Computer-readable media, including permanent and non-permanent and removable and non-removable media, may achieve information storage by any method or technology. The information may be computer-readable instructions, data structures, program modules, or other data. Examples of computer storage media include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk-read only memory (CD-ROM), digital versatile disk (DVD) or other optical storage, cassette tapes, magnetic tape and disk storage or other magnetic storage devices, or any other non-transmitting media that may be used to store computer-accessible information. In accordance with the definitions in this document, computer-readable media do not include non-temporary computer-readable media (transitory media) such as modulated data signals and carrier waves.

A person skilled in the art should understand that embodiments of the present application can be provided as methods, systems, or computer program products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program code.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
      obtain a plurality of video frames;
      determine a target object in the plurality of video frames using a tracking recognition technique;
      determine time slice information corresponding to the target object;
      use the time slice information corresponding to the target object to determine one or more similar objects relative to the target object;
      compare current playback information of a playing of the plurality of video frames to a time range defined by the time slice information corresponding to the target object, wherein the time range defined by the time slice information is associated with a segment of the plurality of video frames that includes an appearance of the target object;
      determine that the current playback information is within the time range defined by the time slice information corresponding to the target object;
      in response to the determination that the current playback information is within the time range defined by the time slice information corresponding to the target object, present information on the one or more similar objects relative to the target object; and
      output the information on the one or more similar objects relative to the target object; and
   one or more memories coupled to the one or more processors and configured to provide the one or more processors with instructions.

2. The system of claim 1, wherein to use the time slice information corresponding to the target object to determine the one or more similar objects relative to the target object comprises to:
   determine a set of video frames that includes the target object based at least in part on the time slice information corresponding to the target object; and
   use the set of video frames to search in a similar object library for the one or more similar objects relative to the target object.

3. The system of claim 2, wherein to use the set of video frames to search in the similar object library for the one or more similar objects relative to the target object comprises to:
   determine a keyframe among the set of video frames that includes the target object; and
   use the keyframe to search in the similar object library for the one or more similar objects relative to the target object.

4. The system of claim 3, wherein to determine the keyframe among the set of video frames that includes the target object comprises to:

for each video frame in the set of video frames that includes the target object, determine a corresponding bounding box corresponding to the target object in that video frame; and determine the keyframe based at least in part on a largest bounding box being associated with the target object in the keyframe.

5. The system of claim 3, wherein the one or more processors are further configured to store a mapping between identifying information of the keyframe and the information on the one or more similar objects relative to the target object.

6. The system of claim 1, wherein the one or more processors are further configured to store a mapping between identifying information of the target object and the information on the one or more similar objects relative to the target object.

7. The system of claim 1, wherein the one or more processors are further configured to:

determine that a number of the one or more similar objects relative to the target object is greater than a preset number;

determine respective degrees of similarity between the one or more similar objects relative to the target object and the target object;

rank the one or more similar objects relative to the target object based on the respective degrees of similarity; and select the preset number of the ranked one or more similar objects relative to the target object for which information is to be output.

8. The system of claim 1, wherein to output the information on the one or more similar objects relative to the target object comprises to cause the information on the one or more similar objects relative to the target object to be presented as bullet screen messages in a manner that overlays the playing of the plurality of video frames.

9. A method, comprising:

obtaining a plurality of video frames;

determining a target object in the plurality of video frames using a tracking recognition technique;

determining time slice information corresponding to the target object;

using the time slice information corresponding to the target object to determine one or more similar objects relative to the target object;

comparing current playback information of a playing of the plurality of video frames to a time range defined by the time slice information corresponding to the target object, wherein the time range defined by the time slice information is associated with a segment of the plurality of video frames that includes an appearance of the target object;

determining that the current playback information is within the time range defined by the time slice information corresponding to the target object;

in response to the determination that the current playback information is within the time range defined by the time slice information corresponding to the target object, presenting information on the one or more similar objects relative to the target object; and outputting the information on the one or more similar objects relative to the target object.

10. The method of claim 9, wherein using the time slice information corresponding to the target object to determine the one or more similar objects relative to the target object comprises:

determining a set of video frames that includes the target object based at least in part on the time slice information corresponding to the target object; and using the set of video frames to search in a similar object library for the one or more similar objects relative to the target object.

11. The method of claim 10, wherein using the set of video frames to search in the similar object library for the one or more similar objects relative to the target object comprises:

determining a keyframe among the set of video frames that includes the target object; and using the keyframe to search in the similar object library for the one or more similar objects relative to the target object.

12. The method of claim 11, wherein determining the keyframe among the set of video frames that includes the target object comprises:

for each video frame in the set of video frames that includes the target object, determining a corresponding bounding box corresponding to the target object in that video frame; and determining the keyframe based at least in part on a largest bounding box being associated with the target object in the keyframe.

13. The method of claim 11, further comprising storing a mapping between identifying information of the keyframe and the information on the one or more similar objects relative to the target object.

14. The method of claim 9, further comprising storing a mapping between identifying information of the target object and the information on the one or more similar objects relative to the target object.

15. The method of claim 9, further comprising:

determining that a number of the one or more similar objects relative to the target object is greater than a preset number;

determining respective degrees of similarity between the one or more similar objects relative to the target object and the target object;

ranking the one or more similar objects relative to the target object based on the respective degrees of similarity; and selecting the preset number of the ranked one or more similar objects relative to the target object for which information is to be output.

16. The method of claim 9, wherein outputting the information on the one or more similar objects relative to the target object comprises causing the information on the one or more similar objects relative to the target object to be presented as bullet screen messages in a manner that overlays a playing of the plurality of video frames.

17. A system, comprising:

one or more processors configured to:

play a plurality of video frames;

determine that current playback information associated with the playing of the plurality of video frames corresponds to time slice information corresponding to a target object by comparing the current playback information of the playing of the plurality of video frames to a time range defined by the time slice information corresponding to the target object, wherein the time range defined by the time slice information is associated with a segment of the plurality of video frames that includes an appearance of the target object;

determine that the current playback information is within the time range defined by the time slice information corresponding to the target object;

in response to the determination that the current playback information is within the time range defined by the time slice information corresponding to the target object, obtain information on one or more similar objects relative to the target object; and present the information on the one or more similar objects relative to the target object in a manner that overlays a presentation of the playing of the plurality of video frames; and one or more memories coupled to the one or more processors and configured to provide the one or more processors with instructions.

18. The system of claim 17, wherein to present the information on the one or more similar objects relative to the target object comprises to present the information as bullet screen messages.

19. The system of claim 17, wherein to present the information on the one or more similar objects relative to the target object is performed in response to receipt of a user trigger operation.

20. The system of claim 17, wherein to present the information on the one or more similar objects relative to the target object is performed without receipt of a user trigger operation.

* * * * *

UNITED STATES PATENT AND TRADEMARK OFFICE
CERTIFICATE OF CORRECTION

| | |
|---|---|
| PATENT NO. | : 11,284,168 B2 |
| APPLICATION NO. | : 17/076345 |
| DATED | : March 22, 2022 |
| INVENTOR(S) | : Yanhao Zhang et al. |

It is certified that error appears in the above-identified patent and that said Letters Patent is hereby corrected as shown below:

On the Title Page

Item (73), assignee, address, after "Alibaba Group Holding Limited", insert --, (KY)--.

Signed and Sealed this
Sixteenth Day of August, 2022

Katherine Kelly Vidal
*Director of the United States Patent and Trademark Office*